US009696995B2

(12) United States Patent
Eichenberger et al.

(10) Patent No.: US 9,696,995 B2
(45) Date of Patent: *Jul. 4, 2017

(54) PARALLEL EXECUTION UNIT THAT EXTRACTS DATA PARALLELISM AT RUNTIME

(75) Inventors: Alexandre E. Eichenberger, Chappaqua, NY (US); Brian K. Flachs, Georgetown, TX (US); Charles R. Johns, Austin, TX (US); Mark R. Nutter, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2080 days.

This patent is subject to a terminal disclaimer.

(21) Appl. No.: 12/649,805

(22) Filed: Dec. 30, 2009

(65) Prior Publication Data

US 2011/0161642 A1 Jun. 30, 2011

(51) Int. Cl.
G06F 9/38 (2006.01)
G06F 9/30 (2006.01)
G06F 9/32 (2006.01)

(52) U.S. Cl.
CPC .......... G06F 9/30076 (2013.01); G06F 9/325 (2013.01); G06F 9/3834 (2013.01); G06F 9/3838 (2013.01)

(58) Field of Classification Search
CPC .. G06F 9/30076; G06F 9/3838; G06F 9/3834; G06F 9/325
USPC ........................................................ 712/233
See application file for complete search history.

(56) References Cited

U.S. PATENT DOCUMENTS

| 5,481,723 A * | 1/1996 | Harris et al. .................. 717/160 |
| 5,535,393 A | 7/1996 | Reeve et al. |
| 7,404,041 B2 | 7/2008 | Gara et al. |
| 8,019,977 B2 * | 9/2011 | Gonion et al. ................. 712/225 |
| 8,131,979 B2 * | 3/2012 | Gonion et al. ................. 712/216 |

(Continued)

FOREIGN PATENT DOCUMENTS

| EP | 0 691 607 A2 | 1/1996 |
| EP | 0 843 258 A2 | 5/1998 |
| WO | WO0229941 | 5/2000 |

OTHER PUBLICATIONS

Zhang et al. "Hardware for Speculative Parallelization of Partially-Parallel Loops in DSM Multiprocessors". IEEE, 1999. 5 pages.*

(Continued)

*Primary Examiner* — Yuqing Xiao
(74) *Attorney, Agent, or Firm* — Stephen J. Walder, Jr.; Thomas E. Tyson

(57) ABSTRACT

Mechanisms for extracting data dependencies during runtime are provided. With these mechanisms, a portion of code having a loop is executed. A first parallel execution group is generated for the loop, the group comprising a subset of iterations of the loop less than a total number of iterations of the loop. The first parallel execution group is executed by executing each iteration in parallel. Store data for iterations are stored in corresponding store caches of the processor. Dependency checking logic of the processor determines, for each iteration, whether the iteration has a data dependence. Only the store data for stores where there was no data dependence determined are committed to memory.

20 Claims, 8 Drawing Sheets

(56) References Cited

U.S. PATENT DOCUMENTS

| | | |
|---|---|---|
| 2003/0005029 A1 | 1/2003 | Shavit et al. |
| 2004/0194074 A1 | 9/2004 | Shibayama et al. |
| 2006/0004996 A1* | 1/2006 | Gonion .................. 712/241 |
| 2007/0294681 A1 | 12/2007 | Tuck et al. |
| 2008/0195847 A1* | 8/2008 | Wu et al. .................. 712/216 |
| 2009/0288075 A1 | 11/2009 | Song et al. |
| 2011/0161643 A1 | 6/2011 | Eichenberger et al. |

OTHER PUBLICATIONS

Zhang, Ye et al. "Hardware for speculative parallelization of partially-parallel loops in DSM multiprocessors". 2 pages, Jan. 1999.*
Gibbs, Ben et al., "IBM eServer BladeCenter JS20 PowerPc 970 Programming Environment", Jan. 2005, www.redbooks.ibm.com/redpapers/pdfs/redp3890.pdf, 140 pages.
Eichenberger, Alexandre E. et al., "Runtime Extraction of Data Parallelism", U.S. Appl. No. 12/649,860, filed Dec. 30, 2009.
U.S. Appl. No. 13/434,903, 1 page.
U.S. Appl. No. 13/435,411, 1 page.
International Search Report and Written Opinion dated Apr. 26, 2011 for International Application No. PCT/EP2010/069506, 10 pages.
U.S. Appl. No. 12/649,860, 1 page.
Lam, Monica S., "Complier Optimizations for Superscalar Computers", Computing Methods in Applied Sciences and Engineering, London, GB, Jan. 29, 1990, pp. 360-377.
Schlansker, Michael et al., "Parallelization of Control Recurrences for ILP Processors", International Journal of Parallel Programming, Plenum Press, New York, US, vol. 24, No. 1, Feb. 1, 1996, pp. 65-102.
Office Action mailed Aug. 21, 2012 for U.S. Appl. No. 13/435,411, 11 pages.
Office Action mailed Aug. 22, 2012 for U.S. Appl. No. 12/649,860, 15 pages.
Office Action mailed Oct. 26, 2012 for U.S. Appl. No. 13/434,903, 18 pages.
Response to Office Action filed with the USPTO on Nov. 16, 2012 for U.S. Appl. No. 13/435,411, 18 pages.
Zhang, Ye et al., "Hardware for Speculative Run-Time Parallelization in Distributed Shared-Memory Multiprocessors", IEEE, 1998, 12 pages.
Interview Summary mailed Jan. 25, 2013 for U.S. Appl. No. 13/434,903, 9 pages.
Response to Office Action filed with the USPTO on Jan. 25, 2013 for U.S. Appl. No. 13/434,903, 21 pages.
Response to Office Action filed with the USPTO on Nov. 19, 2012 for U.S. Appl. No. 12/649,860, 19 pages.

* cited by examiner

PARALLEL EXECUTION UNIT THAT EXTRACTS DATA PARALLELISM AT RUNTIME

BACKGROUND

The present application relates generally to an improved data processing apparatus and method and more specifically to a parallel execution unit that extracts data parallelism at runtime.

Multimedia extensions (MMEs) have become one of the most popular additions to general-purpose microprocessors. Existing multimedia extensions can be characterized as Single Instruction Multiple Datapath (SIMD) units that support packed fixed-length vectors. The traditional programming model for multimedia extensions has been explicit vector programming using either (in-line) assembly or intrinsic functions embedded in a high-level programming language. Explicit vector programming is time-consuming and error-prone. A promising alternative is to exploit vectorization technology to automatically generate SIMD codes from programs written in standard high-level languages.

Although vectorization has been studied extensively for traditional vector processors decades ago, vectorization for SIMD architectures has raised new issues due to several fundamental differences between the two architectures. To distinguish between the two types of vectorization, the latter is referred to as SIMD vectorization, or SIMDization. One such fundamental difference comes from the memory unit. The memory unit of a typical SIMD processor bears more resemblance to that of a wide scalar processor than to that of a traditional vector processor. In the VMX instruction set found on certain PowerPC microprocessors (produced by International Business Machines Corporation of Armonk, N.Y.), for example, a load instruction loads 16-byte contiguous memory from 16-byte aligned memory, ignoring the last 4 bits of the memory address in the instruction. The same applies to store instructions.

There has been a recent spike of interest in compiler techniques to automatically extract SIMD or data parallelism from programs. This upsurge has been driven by the increasing prevalence of SIMD architectures in multimedia processors and high-performance computing. These processors have multiple function units, e.g., floating point units, fixed point units, integer units, etc., which can execute more than one instruction in the same machine cycle to enhance the uni-processor performance. The function units in these processors are typically pipelined.

Extracting data parallelism from an application is a difficult task for a compiler. In most cases, except for the most trivial loops in the application code, the extraction of parallelism is a task the application developer must perform. This typically requires a restructuring of the application to allow the compiler to extract the parallelism or explicitly coding the parallelism using multiple threads, a SIMD intrinsic, or vector data types available in new programming models, such as OpenCL.

Before a compiler can determine if a program loop can be parallelized, the compiler must prove that each pass through the programming loop is independent and no data dependencies between successive loops exist, i.e. one iteration of the loop does not depend on the value generated in a previous iteration of a loop or a current iteration of the loop does not generate a value that will cause a subsequent iteration of the loop to access incorrect data by writing or storing to a same memory location that a subsequent iteration accesses. Take the following loop as an example:

```
for (i=0; i<N; i++) {
    A[i] = foo(i, h, d, p, x);
}
```

This loop sets A[i] to the return value from function "foo." If the compiler cannot see the function "foo" at compile time, e.g., the function "foo" is in a different code that is called by the present program being compiled, the compiler has no choice but to assume the loop cannot be performed in parallel fashion and thus, generates scalar code for the loop, i.e. non-parallel code (sequential code). By in-lining the function "foo," the compiler can examine the code and possibly discover the parallelism, but the codes size of the application may grow substantially with such in-lining. Even if the compiler can examine all the code within the loop, there are cases where it is impossible to determine if parallelizing the loop is safe, i.e. there are no dependencies between iterations of the loop. For example, consider the following code example for the function "foo":

```
tmp1 = h[i] + d[i];
if (tmp1 < x[tmp1])
    h[tmp1] = tmp1;
return p[tmp1];
```

In this code segment, the contents of the array "h" are conditionally updated based on the data within the arrays "h", "d", and "x". For this code, it is impossible for a compiler, or even the application developer, to guarantee that all iterations of the loop can be performed in parallel. The compiler and/or application developer therefore, can only perform the loop as a scalar operation, even though for certain data values (or perhaps all data values), the update of array "h" in an iteration of the loop does not affect the results of subsequent loop iterations.

SUMMARY

In one illustrative embodiment, a method, in a data processing system having a processor and a system memory, for extracting data dependencies during runtime is provided. The method comprises executing a portion of code having a loop. A first parallel execution group is generated for the loop, the group comprising a subset of iterations of the loop less than a total number of iterations of the loop. The first parallel execution group is executed by executing each iteration in parallel. Store data for iterations are stored in corresponding store caches of the processor. Dependency checking logic of the processor determines, for each iteration, whether the iteration has a data dependence. Only the store data for stores where there was no data dependence determined are committed to memory.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
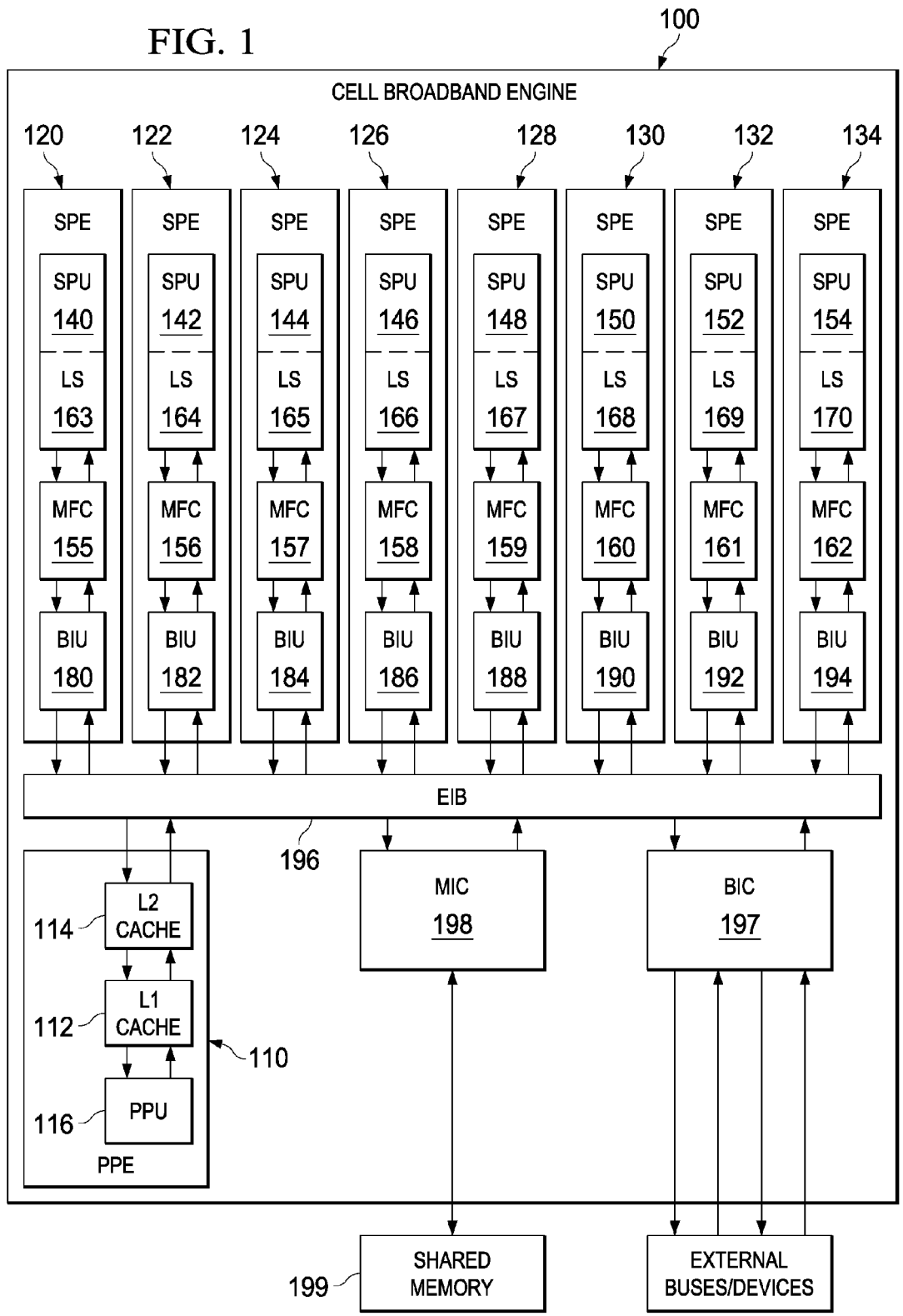
FIG. 1 is an exemplary block diagram of a data processing system in which aspects of the present invention may be implemented.

The illustrative embodiments provide a mechanism for runtime extraction of data parallelism. The mechanisms of the illustrative embodiments allow an application developer and/or the compiler to assume that each loop iteration of a program loop is independent, i.e. there is no forward data dependence. For purposes of the following description, when data dependence is referred to herein, what is meant is forward data dependence, i.e. a loop, or iteration of a loop, executed later in programmatic order depending on data modified by an earlier loop, or earlier iteration of a loop, in programmatic order.

The processor detects when an iteration of the loop affects the results of subsequent loops and allows for such iterations to be performed in a scalar manner. As a result, multiple iterations of the loop can be performed in a parallel group, either using multiple threads, SIMD vectorization, or the like. At the end of each parallel loop execution, the results are committed for only the loop iterations where the results are truly independent. When the processor executes an iteration of the loop and detects a previous iteration could have affected the results of the executed iteration, the results for this iteration and all subsequent iterations in the parallel execution group are not committed.

The mechanisms of the illustrative embodiments are preferably implemented in conjunction with a compiler that transforms source code into code for execution on one or more processors capable of performing vectorized instructions, e.g., single instruction, multiple data (SIMD) instructions. One example of a data processing system in which SIMD capable processors are provided is the Cell Broadband Engine (CBE) available from International Business Machines Corporation of Armonk, N.Y. While the following description will assume a CBE architecture is used to implement the mechanisms of the illustrative embodiments, it should be appreciated that the present invention is not limited to use with the CBE architecture. To the contrary, the mechanisms of the illustrative embodiments may be used with any architecture in which array reference safety analysis may be used with transformations performed by a compiler. The CBE architecture is provided hereafter as only one example of one type of data processing system in which the mechanisms of the illustrative embodiments may be utilized and is not intended to state or imply any limitation with regard to the mechanisms of the illustrative embodiments.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 is an exemplary block diagram of a data processing system in which aspects of the present invention may be implemented. The exemplary data processing system shown in FIG. 1 is an example of the Cell Broadband Engine (CBE) data processing system. While the CBE will be used in the description of the preferred embodiments of the present invention, the present invention is not limited to such, as will be readily apparent to those of ordinary skill in the art upon reading the following description.

As shown in FIG. 1, the CBE 100 includes a power processor element (PPE) 110 having a processor (PPU) 116 and its L1 and L2 caches 112 and 114, and multiple synergistic processor elements (SPEs) 120-134 that each has its own synergistic processor unit (SPU) 140-154, memory flow control 155-162, local memory or store (LS) 163-170, and bus interface unit (BIU unit) 180-194 which may be, for example, a combination direct memory access (DMA), memory management unit (MMU), and bus interface unit. A high bandwidth internal element interconnect bus (EIB) 196, a bus interface controller (BIC) 197, and a memory interface controller (MIC) 198 are also provided.

The local memory or local store (LS) 163-170 is a non-coherent addressable portion of a large memory map which, physically, may be provided as small memories coupled to the SPUs 140-154. The local stores 163-170 may be mapped to different address spaces. These address regions are continuous in a non-aliased configuration. A local store 163-170 is associated with its corresponding SPU 140-154 and SPE 120-134 by its address location, such as via the SPU Identification Register, described in greater detail hereafter. Any resource in the system has the ability to read/write from/to the local store 163-170 as long as the local store is not placed in a secure mode of operation, in which case only its associated SPU may access the local store 163-170 or a designated secured portion of the local store 163-170.

The CBE 100 may be a system-on-a-chip such that each of the elements depicted in FIG. 1 may be provided on a single microprocessor chip. Moreover, the CBE 100 is a heterogeneous processing environment in which each of the SPUs may receive different instructions from each of the other SPUs in the system. Moreover, the instruction set for the SPUs is different from that of the PPU, e.g., the PPU may execute Reduced Instruction Set Computer (RISC) based instructions while the SPU executes vector instructions. In another aspect of the CBE architecture, the PPU supports the Power Instruction Set Architecture (ISA) data-parallel SIMD extensions.

The SPEs 120-134 are coupled to each other and to the L2 cache 114 via the EIB 196. In addition, the SPEs 120-134 are coupled to MIC 198 and BIC 197 via the EIB 196. The MIC 198 provides a communication interface to shared memory 199. The BIC 197 provides a communication interface between the CBE 100 and other external buses and devices.

The PPE 110 is a dual threaded PPE 110. The combination of this dual threaded PPE 110 and the eight SPEs 120-134 makes the CBE 100 capable of handling 10 simultaneous threads and over 128 outstanding memory requests. The PPE 110 acts as a controller for the other eight SPEs 120-134 which handle most of the computational workload. The PPE 110 may be used to run conventional operating systems while the SPEs 120-134 perform vectorized floating point code execution, for example.

The SPEs 120-134 comprise a synergistic processing unit (SPU) 140-154, memory flow control units 155-162, local memory or store 163-170, and an interface unit 180-194. The local memory or store 163-170, in one exemplary embodiment, comprises a 256 KB instruction and data memory which is visible to the PPE 110 and can be addressed directly by software.

The PPE 110 may load the SPEs 120-134 with small programs or threads, chaining the SPEs together to handle each step in a complex operation. For example, a set-top box incorporating the CBE 100 may load programs for reading a DVD, video and audio decoding, and display, and the data would be passed off from SPE to SPE until it finally ended up on the output display. At 4 GHz, each SPE 120-134 gives a theoretical 32 GFLOPS of performance with the PPE 110 having a similar level of performance.

The memory flow control units (MFCs) 155-162 serve as an interface for an SPU to the rest of the system and other elements. The MFCs 155-162 provide the primary mechanism for data transfer, protection, and synchronization between main storage and the local storages 163-170. There is logically an MFC for each SPU in a processor. Some implementations can share resources of a single MFC between multiple SPUs. In such a case, all the facilities and commands defined for the MFC must appear independent to software for each SPU. The effects of sharing an MFC are limited to implementation-dependent facilities and commands.

With the data processing system 100 of FIG. 1, the processor 106 may have facilities for processing both integer (scalar) and floating point (vector) instructions and operating on both types of data. The scalar facilities may be used for integer processing and inter alia loop control and memory access control, for example. The vector facilities may be used for data parallel operations to take advantage of efficiencies in operating on data in a parallel manner.

Figure 2:
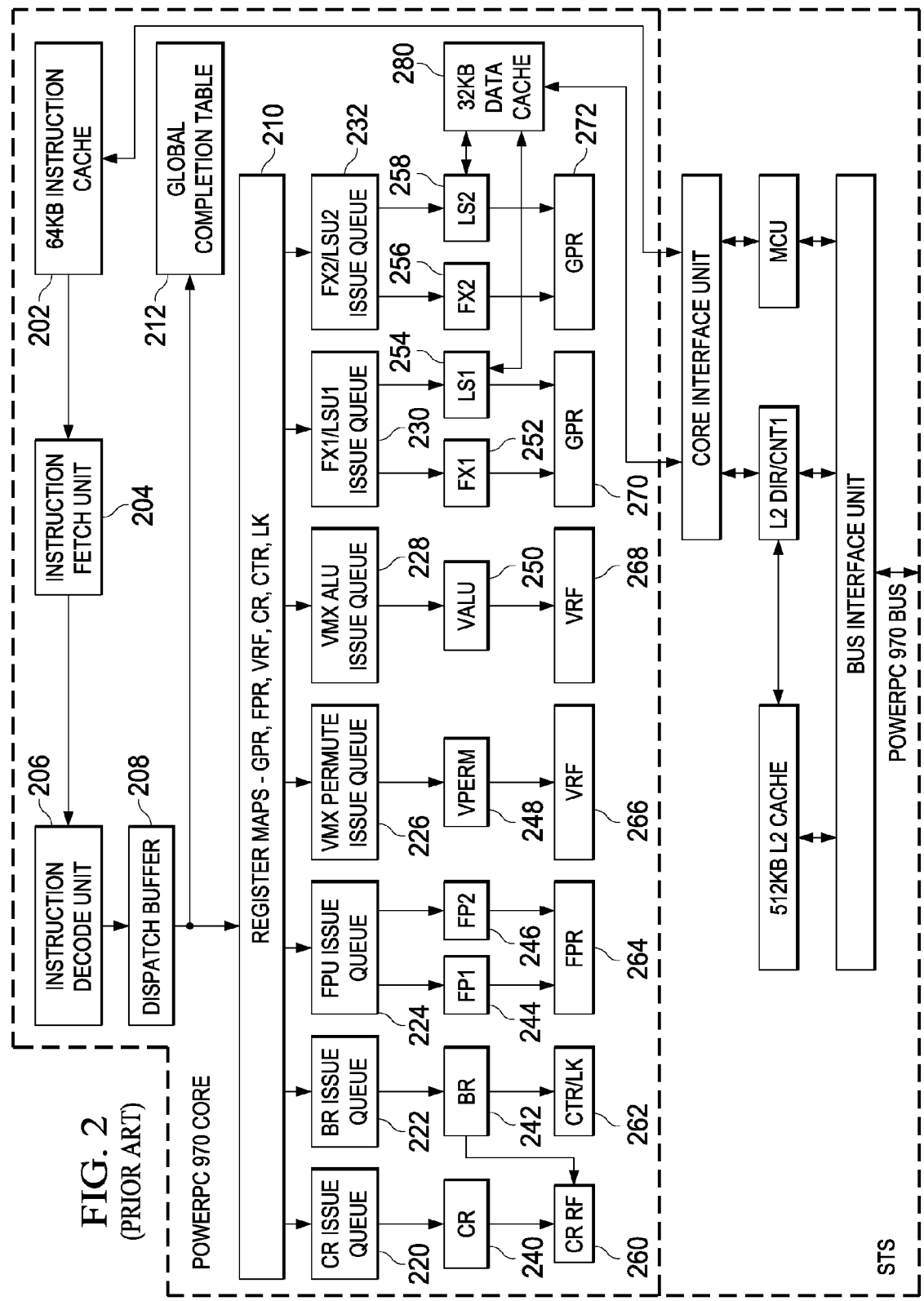
FIG. 2 is a block diagram of a processor architecture shown for purposes of discussion of the improvements made by the illustrative embodiments.

FIG. 2 is a block diagram of a processor architecture shown for purposes of discussion of the improvements made by the illustrative embodiments. The particular processor architecture shown in FIG. 2 is for the PowerPC™ 970 microprocessors available from International Business Machines Corporation of Armonk, N.Y. and described in the Redbook by Gibbs et al. entitled "IBM eServer BladeCenter JS20 PowerPC 970 Programming Environment," January 2005 (available at www.redbooks.ibm.com/redpapers/pdfs/redp3890.pdf).

As shown in FIG. 2, the processor architecture includes an instruction cache 202, an instruction fetch unit 204, an instruction decode unit 206, and a dispatch buffer 208. Instructions are fetched by the instruction fetch unit 204 from the instruction cache 202 and provided to the instruction decode unit 206. The instruction decode unit 206 decodes the instruction and provides the decoded instruction to the dispatch buffer 208. The output of the decode unit 206 is provided to both the register maps 210 and the global completion table 212. The register maps 210 map to one or more of the general purpose registers (GPRs), floating point registers (FPRs), vector register files (VRF), and the like. The instructions are then provided to an appropriate one of the issues queues 220-232 depending upon the instruction type as determined through the decoding and mapping of the instruction decode unit 206 and register maps 210. The issue queues 220-232 provide inputs to various ones of execution units 240-258. The outputs of the execution units 240-258 go to various ones of the register files 260-272. Data for use with the instructions may be obtained via the data cache 280.

Of particular note, it can be seen in the depicted architecture that there are separate issue queues and execution units for floating point, vector, and fixed point, or integer, instructions in the processor. As shown, there is a single floating point unit (FPU) issue queue 224 that has two output ports to two floating point execution units 244-246 which in turn have output ports to a floating point register file 264. A single vector permute issue queue 226 has a single output port to a vector permute execution unit 248 which in turn has a port for accessing a vector register file (VRF) 266. The vector arithmetic logic unit (ALU) issue queue 228 has one issue port for issuing instructions to the vector ALU 250 which has a port for accessing the vector register file 268. It should be appreciated that these issue queues, execution units, and register files all take up resources, area, and power.

Figure 3:
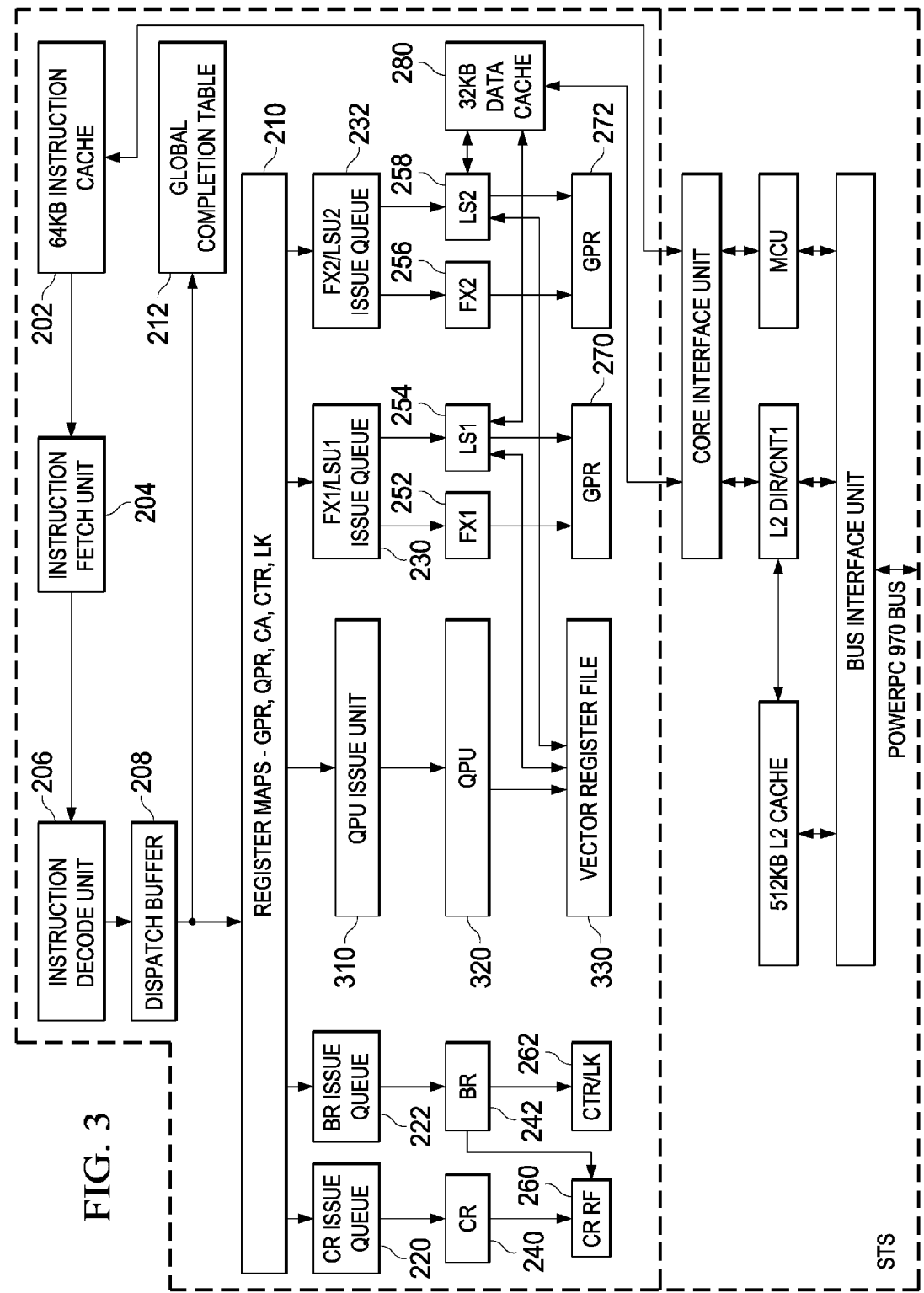
FIG. 3 is an exemplary diagram showing the alternative processor architecture in accordance with some illustrative embodiment.

With some illustrative embodiments, these issue units 224-228, the execution units 244-250, and register files 264-268 are replaced with a single issue queue, execution unit, and register file. FIG. 3 is an exemplary diagram showing the alternative processor architecture in accordance with some illustrative embodiment. The processor architecture shown in FIG. 3 is of a modified form of the PowerPC™ 970 architecture shown in FIG. 2 and thus, similar elements to that of FIG. 2 are shown with similar reference numbers. It should be appreciated that the example modified architecture is only an example and similar modifications can be made to other processor architectures to reduce the number of issue units, execution units, and register files implemented in these other architectures. Thus, the mechanisms of the illustrative embodiments are not limited to implementation in a modified form of the PowerPC™ 970 architecture.

As shown in FIG. 3, the modified architecture shown in FIG. 3 replaces the issue units 224-228 with a single quad-processing execution unit (QPU) issue unit 310. Moreover, the execution units 244-250 are replaced with the single quad-processing execution unit (QPU) 320. Furthermore, the register files 264-268 are replaced with a single quad-vector register file (QRF) 330. Because the quad-processing unit (QPU) can execute up to 4 data elements concurrently with a single instruction, this modified architecture not only reduces the resource usage, area usage, and power usage, while simplifying the design of the processor, but the modified architecture also increases performance of the processor.

In one illustrative embodiment, the mechanisms of the illustrative embodiment for runtime extraction of data parallelism are provided primarily as logic elements in the QPU 320. Additional logic may be provided in one or more of the memory units LS1 and LS2 as appropriate. In other illustrative embodiments, the mechanisms of the illustrative embodiments may be implemented as logic in other elements of the modified architecture shown in FIG. 3, such as distributed amongst a plurality of the elements shown in FIG. 3, or in one or more dedicated logic elements coupled to one or more elements shown in FIG. 3. In order to provide one example of the implementation of the illustrative embodiments, it will be assumed for purposes of this description that the mechanisms of the illustrative embodiments are implemented as logic in the QPU 320 unless otherwise indicated.

Referring again to FIG. 1, the SPEs 120-134 and/or PPE 110 of the CBE 100 may make use of a SIMD architecture as shown in FIG. 3, for example, and may use vector instructions, e.g., SIMD instructions, and vector based data storage. Alternatively, other SIMD architectures may be used in which the processors utilize vector instructions having vector elements. Thus, source code may be optimized by a compiler for execution on these SPEs 120-134 or PPE 110 with Power ISA or SIMD ISA extensions, by extracting parallelism from the source code and reconfiguring or transforming the source code to take advantage of this parallelism. In analyzing source code for optimization and transformation into SIMD vectorized code, the compiler may perform data parallel "if-conversion" operations. For example, such if-conversion may be performed using data parallel if-conversion mechanisms and data-parallel select operations as have been previously discussed above.

However, as noted above, with the mechanisms of the illustrative embodiments, the compiler may assume that program loops, e.g., "if" loops, in the source code are able to be optimized using data parallel "if-conversion" because it is assumed that all iterations of the loop are independent. The processor, e.g., SPEs 120-134, PPE 110, or the like, is provided with hardware logic for detecting when this assumption does not hold, distinguishing which iterations of a parallel execution group (or section) are independent and which are not, committing only the independent iterations, and initiating performance of an alternative scalar execution for the dependent iterations.

In order to achieve this functionality, with the mechanisms of the illustrative embodiments, code may be modified to include, in loops of the code, statements specifying the start and end of a data parallelism section, e.g., a "Begin_DP_Section" statement and a "Close_DP_Section" statement. For example, these statements may be added by an application developer for instructing the compiler to start and end a data parallel section of code. When the compiler cannot determine if a portion of code, e.g., a loop, is safe or not safe to execute in parallel, where "safe" refers to the loop not having forward data dependences, the compiler generates the necessary instruction sequence to start and end the data parallel section. This instruction sequence can be a single instruction to start the data parallel section and another to end the data parallel section, for example. Thus, in one illustrative embodiment, the source code may be modified, such as by the application developer, to include the start and end statements. In other illustrative embodiments, the compiler can automatically generate such statements for beginning and ending a data parallel section in response to a determination that the compiler cannot identify the portion of code as being safe or not for parallel execution.

The start data parallelism section statement instructs the compiler to enable hardware detection for a parallel execution of the code segment following the statement. The compiler then generates code for multiple iterations of the loop in parallel. For example, the compiler may generate code for four threads, each executing an iteration of the loop with a specific iteration value. Alternatively, the multiple iterations of the loop may be performed in parallel by generating code for a four-way SIMD vectorized instructions with each vector slot executing the loop with a specific iteration value, e.g., 0, 1, 2, and 3.

The close data parallelism section statement instructs the compiler to generate code to terminate the hardware detection of parallel execution and to check if each loop iteration was data independent of the other iterations. If no data dependency is detected between the iterations, the generated code commits all results to memory. The generated code may then increment a loop count by the number of iterations whose results are committed, e.g., four, and a new parallel execution group (or section) is generated for the next four iteration values, e.g., 4, 5, 6, and 7).

If the hardware logic detects that there is a data dependency, e.g., a value used by thread 2 (or SIMD slot 2) that was possibly altered by another thread (or SIMD slot), the results are only committed for the threads (slots) that are prior to the thread or slot for which dependence was detected, in programmatic order. For example, if the hardware logic detects that a value used by thread 2 (or SIMD slot 2) was possibly altered by another prior thread (or SIMD slot) in programmatic order, the results are only committed for threads 0 and 1 (or SIMD slots 0 and 1). The loop count may then be incremented by only the number of threads or slots whose results were committed, e.g., 2 in this example. A new parallel execution group may then be generated using the remaining values, i.e. the dependent threads or slots, e.g., threads 2 and 3 (or SIMD slots 2 and 3). This process may be continued until all the iterations of the loop are committed.

From a hardware logic standpoint, when the data parallel section is started, such as by encountering the data parallelism section start statement in the code, data loaded by a parallel iteration of a loop in this parallel execution group (or section) is marked with a data parallel identifier (DPID). In one illustrative embodiment, these DPIDs may be allocated to the different threads, e.g., thread IDs in a multithreaded architecture, different vector slots, e.g., vector slot IDs, in a vector architecture, or the like. The DPIDs have an associated order with the lowest order being assigned to the thread or vector slot that is first in programmatic order while the highest order DPID is assigned to the thread that is last in programmatic order (DPID first<DPID last).

The hardware logic comprises facilities for holding each store performed by a parallel iteration in the parallel execution group (or section) until the data parallel group/section completes. In this way, the stores are not performed to the cache or system memory and thus, the cache or system memory state is not updated until after the parallel execution group is committed.

When the execution of the parallel execution group/section ends, such as by reaching a commit stage of the execution, the hardware logic determines if there is any data dependency between the loop iterations in the parallel execution group/section. For example, the hardware logic determines whether a store is performed to data previously loaded by a parallel thread/slot having a DPID that is greater than the current DPID. If so, then a data dependency is determined to exist. All stores from each thread/slot that completes with no data dependency are committed by the hardware logic. Stores from threads/slots that complete with a data dependency are not committed by the hardware logic. Rather, the hardware logic of the processor places the iterations of the loop for which there were dependencies detected in another subsequent parallel execution group/section together.

Referring again to the following example portion of loop code:

```
for (i=0; i<N; i++) {
    A[i] = foo(i, h, d, p, x);
}
``` this code may now be rewritten by the compiler as follows, for example:

```
for (i=0; i<N; i++) {
    Begin_DP_Section;
    A[i] = foo(i, h, d, p, x);
    Close_DP_Section;
}
```

With this example, and assuming a multithreaded environment in which four threads may execute simultaneously, i.e. a simultaneous multithreaded 4 (SMT4) environment, or a SIMD architecture in which vectors comprises four vector slots, iterations 0 to 3 may be executed in parallel by the four threads or using the four SIMD vector slots. With each execution of a four iteration parallel execution group/section, the Begin_DP_Section statement causes the hardware logic to detect and track any dependencies between the iterations within the parallel execution group/section. The "Close_DP_Section" causes the hardware logic to determine whether there were any dependencies by looking at DPID information and buffered stores to determine such dependencies. The commit logic of the processor then commits those iterations in the parallel execution group/section that do not have dependencies while the others are reissued to the processor for execution in a subsequent parallel execution group/section. It should be noted that there is no need to continue the dependency detection between parallel execution groups/sections since the results of each parallel execution group are committed before the next parallel execution group/section is executed.

Figure 4:
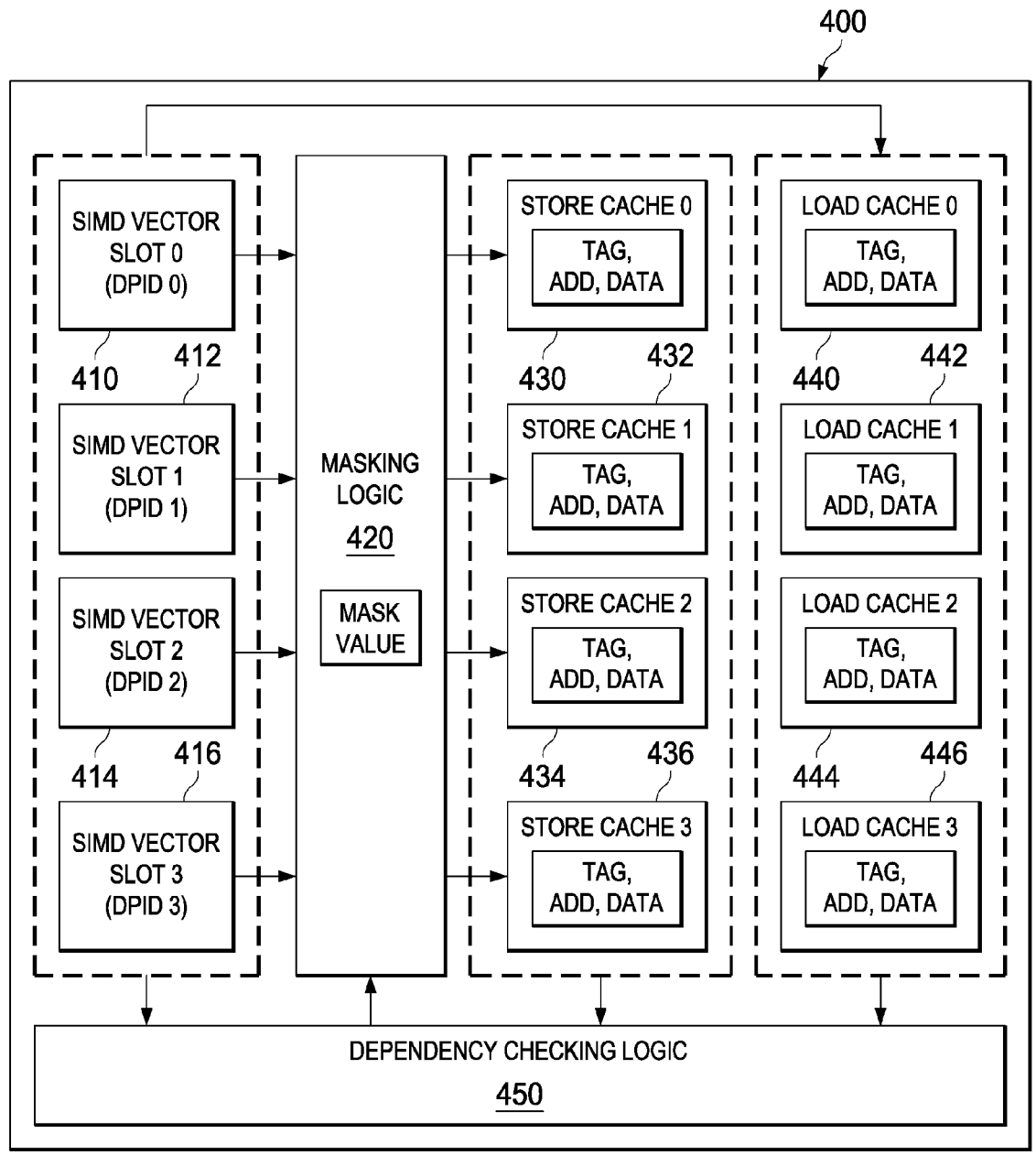
FIG. 4 is an example block diagram illustrating a SIMD unit having logic for performing the various hardware logic operations in accordance with one illustrative embodiment.

FIG. 4 is an example block diagram illustrating a SIMD unit having logic for performing the various hardware logic operations in accordance with one illustrative embodiment. For example, the SIMD unit shown in FIG. 4 may be implemented as, or as part of, the QPU 320 in FIG. 3. The example SIMD unit shown in FIG. 4 is a 4-wide SIMD unit in which there are 4 SIMD vector slots per vector. It should be appreciated that the illustrative embodiments are not limited to use with a SIMD unit or with a 4-wide SIMD unit. As mentioned above, the mechanisms of the illustrative embodiments may be implemented in other architectures, such as multithreaded architectures, or the like, that may or may not use SIMD units. Furthermore, other widths of SIMD units may be utilized without departing from the spirit and scope of the illustrative embodiments. For example, a 2-wide SIMD unit may be utilized.

As shown in FIG. 4, the SIMD unit 400 includes SIMD vector slot registers 410-416. Each SIMD vector slot register 410-416 may store separate independent addresses and data. For example, the SIMD unit 400 may support a scatter/gather functionality for vector units. The data in each SIMD vector slot register 410-416 may correspond to a separate iteration of a loop within a given parallel execution group/section. Thus, for example, SIMD slot 0 410 may store data for a first iteration of a loop, e.g., iteration i=0, SIMD slot 1 412 may store data for a second iteration of the loop, e.g., iteration i=1, SIMD slot 2 414 may store data for a third iteration of the loop, e.g., iteration i=2, and SIMD slot 3 416 may store data for a fourth iteration of the loop, e.g., iteration i=3.

The SIMD vector slot registers 410-416 are coupled to masking logic 420. The masking logic allows software or hardware to prevent a corresponding SIMD vector slot register 410-416 from contributing to the parallel execution. Initially, the masking logic 420 allows all of the SIMD vector slots 410-416 to contribute to the parallel execution results. However, in the event that a dependency is detected, the SIMD vector slot 410-416 corresponding to the iteration for which there is a dependency detected, and any SIMD vector slots 410-416 associated with iterations subsequent to this iteration for which a dependency was detected, are masked such that they cannot contribute to the results of the parallel execution. The masking logic 420 may store a mask value that identifies which SIMD vector slots 410-416 may contribute. For example, initially, the mask value may be set to "1 1 1 1" with bits in the mask value being set to "0" when a dependency is detected with regard to the iteration corresponding to the corresponding SIMD vector slot 410-416. For example, if iteration 2 is determined to have a data dependency, the mask value may be set to "1 1 0 0" indicating that only the first two iterations may contribute to the parallel execution results while iterations 2 and 3 may not contribute to the results.

As shown in FIG. 4, a separate store cache 430-436 is provided for each SIMD vector slot 410-416. Each store cache 430-436 is used to hold the store data from a corresponding SIMD vector slot 410-416 when a corresponding iteration performs a store operation (store). The store caches 430-436 prevent the stores from updating a coherent memory state by storing the data of a store until the parallel execution group/section commits. If the mask value of the masking logic 420 masks off a particular SIMD vector slot 410-416, the corresponding store cache 430-436 will not store the data for that store from that SIMD vector slot 410-416.

The store caches 430-436 have the following attributes. For any given address in a corresponding SIMD vector slot 410-416, the store cache 430-436 can hold different data for the corresponding SIMD vector slot 410-416 than other SIMD vector slots 410-416 (the execution of instructions for an iteration corresponding to a SIMD vector slot 410-416 or a thread is referred to as a "parallel unit"). Thus, in one illustrative embodiment, the store caches 430-436 may be independent structures partitioned for each parallel unit from a larger memory structure. The store caches 430-436 hold all data stored by the corresponding parallel unit but can hold other store data. Data not stored by a currently active parallel unit can be evicted at any time from the store caches 430-436. The store caches 430-436 store tag information and data, where the tag information includes, in one illustrative embodiment, for a particular address, a DPID, an indication of whether each portion of data (e.g., a byte) in the store data is valid, and an indication as to whether the DPID is valid or not. The store caches 430-436 provide data for all load requests from load operations corresponding to iterations having a DPID greater than the DPID of data in the store cache 430-436 in order to provide the most recent data for forward dependencies. The store caches 430-436 are full when new stores cannot be allocated, which causes one or more data parallel terminations.

When a store operation is performed by an instruction corresponding to one of the SIMD vector slots 410-416, the address, tag information, and data of the store operation are placed into the associated store cache 430-436. At the same time, a corresponding load table data structure 440-446, described hereafter, is snooped by dependency checking logic 450 to determine if the data was previously loaded by a DPID greater than the DPID performing the store operation. If the snoop hits, i.e. the data was previously loaded by a DPID greater than the DPID performing the store operation, a data dependency is recorded by setting a masking value bit in the masking logic 420 corresponding to the DPID that hits and all DPIDs greater than the DPID that hits.

As a result, those SIMD vector slots 410-416 that are masked off will not contribute to the results of the parallel execution and will not be committed. When such a dependency is detected by the dependency checking logic 450, the dependency checking logic 450 may invert the mask value bits of the masking logic 420 and reissue the parallel execution group/section such that now only the operations corresponding to the SIMD vector slots 410-416 that did not commit in the previous execution will be allowed to update their corresponding store caches 430-436 and load table data structures 440-446, described hereafter.

As touched on above, separate load table data structures 440-446 are provided for each of the SIMD vector slots 410-416. The load table data structures 440-446 hold the data parallel identifier (DPID) for the data loaded by the parallel iterations of the loop in the parallel execution group/section. That is, when a load is performed by a SIMD vector slot 410-416, the address and possibly the data, corresponding to the load is placed into the corresponding load table data structure 440-446. A DPID is also included with tag information stored in the load table data structure 440-446. The tag is able to contain a DPID for all loop iterations performed in parallel in the same parallel execution group/section such that the DPIDs of all loads performed in a same parallel execution group/section may be stored in the load table data structure 440-446. The load table data structures 440-446 may be implemented in many different ways, such as in various memory structures, a load cache structure, or the like.

When a load is performed by an instruction corresponding to a SIMD vector slot 410-416, the store caches 430-436 are snooped by the dependency checking logic 450 to determine if there is a DPID that performed a store of this same data that has a smaller DPID value than the DPID performing the load. If so, i.e. if there is a hit detected, by the dependency checking logic 450, the data from the most significant DPID, which is also greater than or equal to the loading DPID, of the store caches 430-436 snooped is used, i.e. the DPID having the largest DPID number is used. For example, if a store hits the cache associated with SIMD vector slots 1 and 2, the data associated with SIMD vector slot 2 is used, i.e. the most significant of the caches that hit.

If the address cannot be placed into the load table data structure 440-446, the data dependency checking logic 450 cannot operate and the execution will default to a scalar loop, i.e. only the least significant DPID will complete and all other SIMD slots 410-416 are masked off by the masking logic 420. An address cannot be placed in the load table data structure 440-446 when the congruency class for that address is full (i.e. contains information). Since there is no longer tracking information for the load, the logic 450 defaults to a scalar loop. This means, in one illustrative embodiment, that all but the first SIMD vector slot 410 is masked off. For example, a mask of '1111' may result in a mask of '1000' (scalar execution of slot 0) when a load could not be placed into the load table data structure 440-446. Similarly, a mask of '0111' may result in a mask of '0100' (scalar execution of slot 1). Alternatively, it may not be necessary to go to a scalar loop execution using mask '1000', but instead, the mask may be used to effectively cancel a minimum number of SIMD vector slot execution lanes to free space and continue some number of DPIDs.

Using the hardware mechanisms shown in FIG. 4, when the Begin_DP_Section statement is encountered in the code, all the DPIDs in the load table data structures 440-446 are cleared. The store caches 430-436 are guaranteed to store only store data that has been committed by virtue of the masking logic 420 which prevents dependent iterations from providing the store data to the store caches 430-436. For a first pass through the data parallel group/section, the mask logic 420 has its mask value set to "1 1 1 1" (indicating no detected dependencies) thereby permitting all SIMD vector slots 410-416 to contribute to the parallel execution result.

When a load is performed, the dependency detection logic 450 identifies if there are any dependencies based on the DPIDs as previously described above. If there are dependencies, appropriate masking value bits are set to mask-off those loads in the SIMD vector slots 410-416. Similarly, when a store is performed, the dependency detection logic 450 identifies if there are any dependencies based on the DPIDs as also described above. If there are dependencies, again the masking value bits are set to mask-off those stores in the SIMD vector slots 410-416. In this way, only store data corresponding to stores in the parallel execution group/section that do not have any dependencies are actually placed in the store caches 430-436 and may be committed to system memory or a system cache, e.g., L1 or L2 cache.

Upon reaching the "Close_DP_Section statement for a particular parallel execution group/section, the data dependency for each SIMD vector slot 410-416 is evaluated. If there were no data dependencies discovered during the execution, the stores are all committed to system memory or system cache. If multiple SIMD vector slots 410-416 accessed the same memory location, then the data from the right most SIMD vector slot 410-416 (highest DPID) is committed to system memory or system cache. IF a data dependency was detected for a SIMD vector slot 410-416, the stores for that SIMD vector slot 410-416, and all stores for SIMD vector slots 410-416 to the right, are not committed. The parallel execution is then repeated, starting with the "Begin_DP_Section", with the SIMD vector slots that did not complete, i.e. were masked off. With the repeating of the parallel execution, the mask value bits may be inverted such that the SIMD vector slots that did complete and were committed in the previous execution do not contribute to the present execution's results. For example, in a first pass, at the start of the data parallel section the mask value may be initially set to "1 1 1 1" and a dependency may be detected in slot 2. As a result, the mask value may be set to "1 1 0 0" such that the iteration associated with slot 2 and those thereafter are masked off. In a second pass, the mask value bits may be inverted such that the mask value is now "0 0 1 1" to thereby mask off the iterations that completed successfully in the first pass. Assuming no data dependencies being identified in this second pass, the mask value will be unchanged and iterations associated with slots 2 and 3 will be executed successfully.

This process continues until all SIMD vector slots complete successfully and results are committed. When a data dependency does exist, it should be appreciated that the left most unmasked SIMD vector slot 410-416 (lowest unmasked DPID) is always guaranteed to complete successfully and its store, if any, will be committed to system memory or system cache.

As an example of the operation of one illustrative embodiment of the present invention, assume that SIMD vector slot 414 is associated with a store operation that has a detected dependency. As a result, the masking value bit in the masking logic 420 for the SIMD vector slot 414 is set to mask that store. In addition, the masking value bit for SIMD vector slot 416 is also masked. As a result, only the store values, if any, in store caches 430-432 will contribute to the parallel execution result. Thereafter, the masking value bits may be inverted and the execution repeated such that the first two SIMD vector slots 410-412 will not have their store data written to the store caches 430-432. Instead, only the SIMD vector slot 414 is guaranteed in this execution to be completed successfully, i.e. the store data is written to the store cache 434. If the operation of the instruction in SIMD vector slot 416 does not have a dependency, then it also will complete successfully with its result being committed. If, however, this operation has a dependency, then the process is repeated again with the masking value bit for the SIMD vector slot 414 being inverted.

Figure 5:
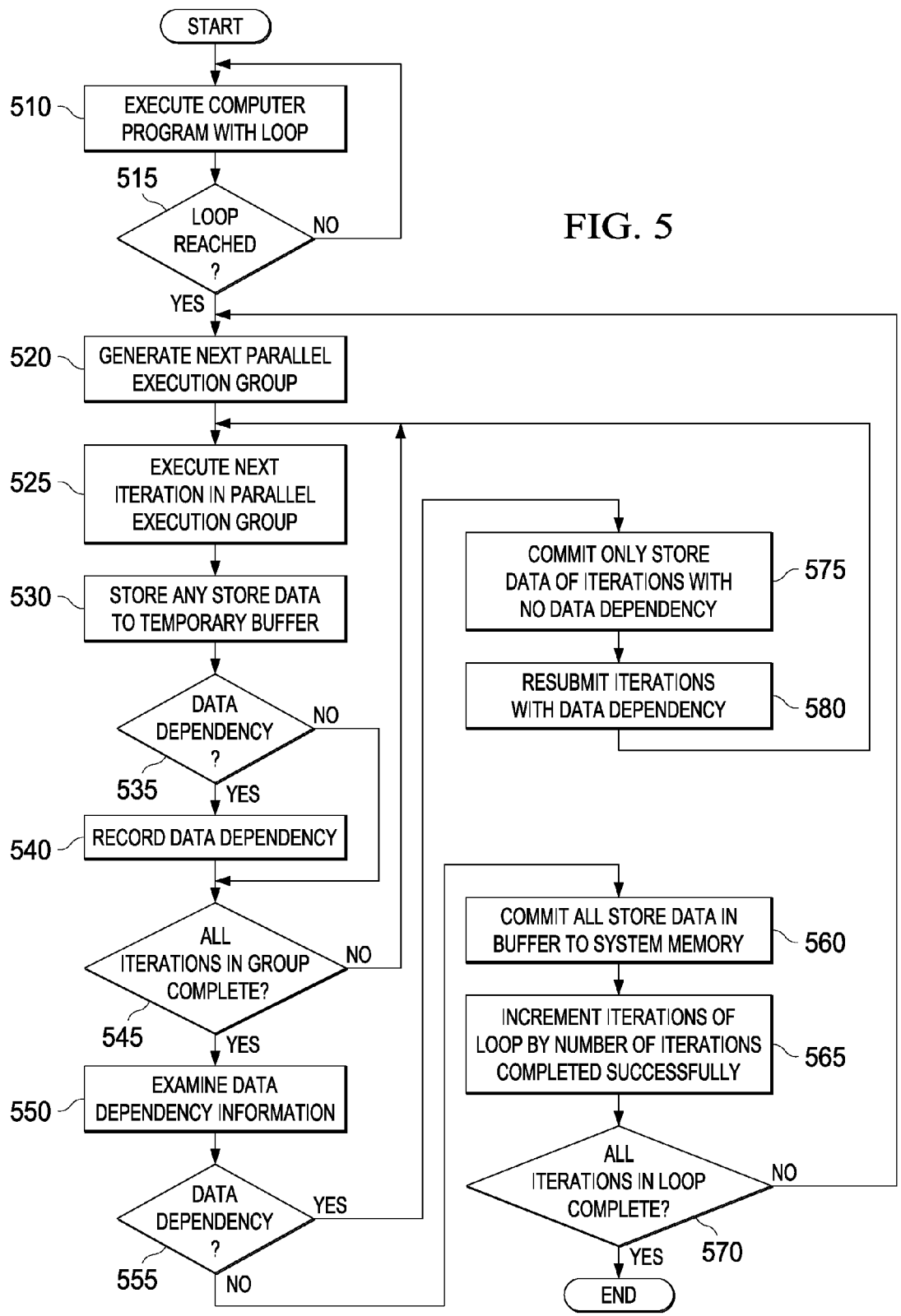
FIG. 5 is a flowchart outlining an example operation for performing runtime extraction of data parallelism in accordance with one illustrative embodiment.

FIG. 5 is a flowchart outlining an example operation for performing runtime extraction of data parallelism in accordance with one illustrative embodiment. FIG. 5 is a general flowchart of such an operation and can be performed entirely in software executed by one or more processors of a data processing system, entirely in hardware of one or more processors of a data processing system, or in any combination of hardware and software. In an entirely software approach, it should be appreciated that the software may be stored in a memory of other storage device and may be executed from that memory by one or more processors to perform the various operations and functions described in the flowchart. Similarly, for a software and hardware embodiment, some of the operations and functions described may be performed in software while others are performed in hardware.

As shown in FIG. 5, the operation starts with the execution of a computer program that includes a loop that is to be executed using data parallel execution (step 510). When the loop is encountered (step 515), a next parallel execution group/section is generated for a predetermined number of iterations from a total number of iterations in the loop, e.g., 4 iterations of the n iterations (step 520). A next iteration in the parallel execution group/section is executed (step 525) and any store data is stored in a temporary buffer and is not permitted to change the system memory state of either system memory or system cache, e.g., L1 or L2 cache (step 530). A determination is made as to whether any data dependencies are encountered during the execution of the iteration in the parallel execution group/section (step 535). If so, the data dependency is recorded (step 540). Thereafter, or if no data dependencies are encountered, a determination is made as to whether all of the iterations in the parallel execution group/section have completed (step 545). If not, then the operation returns to step 525 for the next iteration until all iterations have completed. It should be noted that while steps 525-545 are shows to execute in series for each iteration, in actuality, these steps are performed in parallel for each iteration at substantially the same time.

Once all of the iterations have completed, the recorded dependency information is examined (step 550) and a determination is made as to whether any data dependencies were found (step 555). If not, then all of the store data in the temporary buffer is committed to the system memory or system cache (step 560). The iterations of the loop are then incremented by the number of successfully completed iterations, which in this case all of the iterations in the parallel execution group/section, e.g., 4 (step 565) and a determination is made as to whether all iterations of the loop have been completed (step 570). If not, the operation returns to step 520. Otherwise, the operation terminates.

If there was a detected dependency (step 555), only the store data associated with iterations in the parallel execution group that did not have a detected data dependency, and do not have iteration values higher than an iteration for which a data dependency was detected, have their store data committed to system memory or system cache (step 575). The iterations for which a data dependency was detected, or that occur after an iteration for which a data dependency was detected, are then resubmitted as a separate parallel execution group/section (step 580) and the operation returns to step 525.

Figure 6:
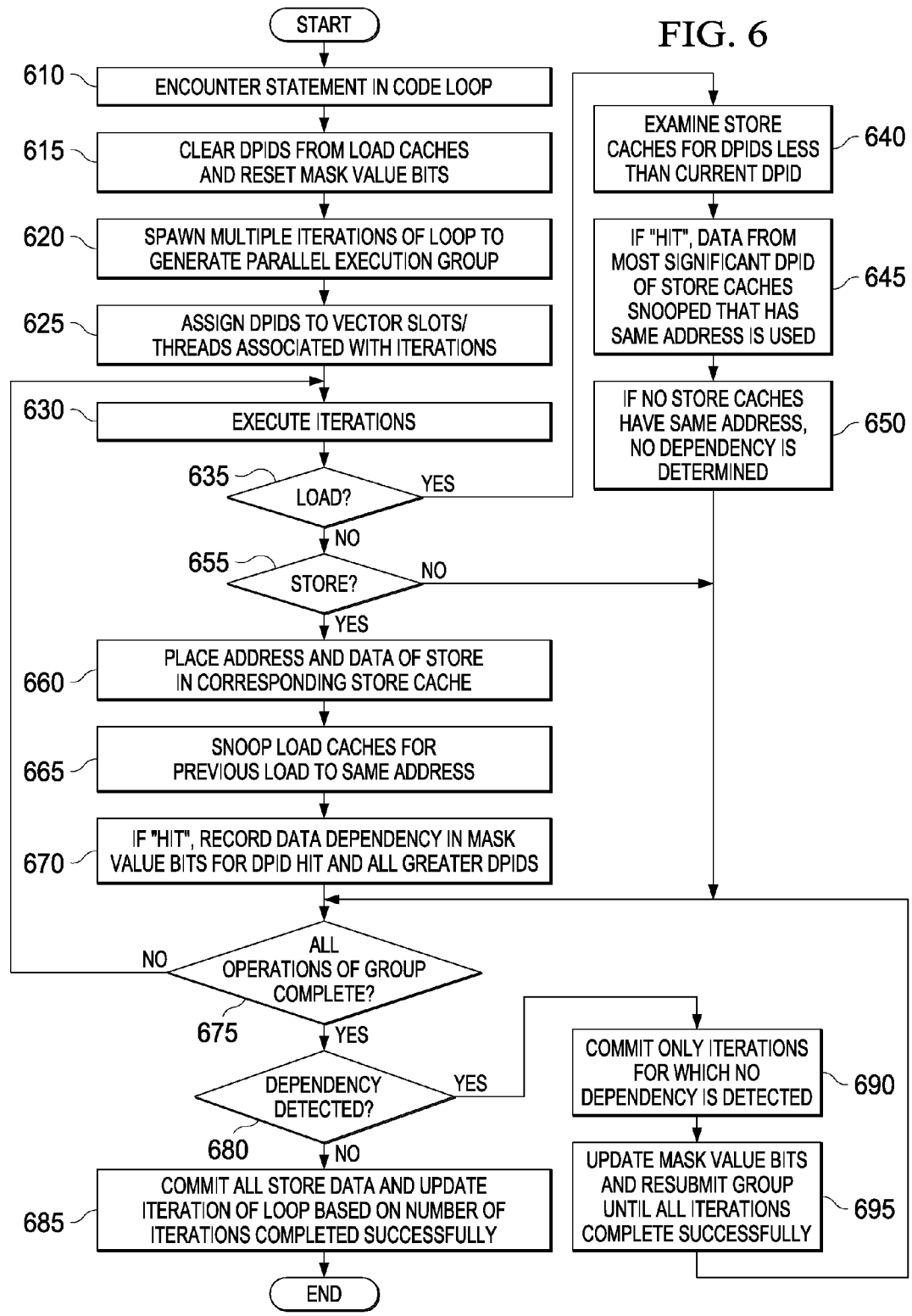
FIG. 6 is a flowchart outlining an operation of one illustrative embodiment in which a SIMD architecture having hardware mechanisms for detecting dependencies and masking off iterations of a loop for which dependencies have been identified is utilized.

FIG. 6 is a flowchart outlining an operation of one illustrative embodiment in which a SIMD architecture having hardware mechanisms for detecting dependencies and masking off iterations of a loop for which dependencies have been identified is utilized. The operation shown in FIG. 6 may be one specific embodiment of the operation outlined in FIG. 5 above, for example.

As shown in FIG. 6, the operation starts with the encountering of a statement in the code that initiates a data parallel execution of a loop in the code (step 610). DPIDs are cleared from the load table data structures and the mask value bits are set to an initial value allowing all SIMD vector slots to contribute to the result of the parallel execution (step 615). Multiple iterations of the loop are spawned using the SIMD vector slots and/or multiple threads to thereby generate a parallel execution group/section (step 620). DPIDs are assigned to the SIMD vector slots or threads (step 625). Each iteration is executed (step 630) and for each iteration, a determination is made as to whether the corresponding operation is a load (step 635). If the operation is a load, then the store caches for the DPIDs less than the DPID performing the load are snooped (step 640). If one of these store caches stores the same address as the address for the current load, i.e. there is a hit, then data from the most significant DPID of the store caches snooped that has the same address is used (step 645). If none of the store caches stores the same address as for the current load, then no dependency is determined to exist (step 650).

If the operation is not a load, then a determination is made as to whether the operation is a store (step 655). If so, then the address and data of the store are placed into a corresponding store cache (step 660). The load table data structures are snooped to determine if the data was previously loaded by a DPID greater than the DPID performing the store (step 665). If the snoop hits, a data dependency is recorded in the masking value bits for the DPID that hits and all DPIDs greater than the DPID that hits (step 670).

A determination is made as to whether all operations of the parallel execution group/section have completed (step 675). If not, the operation returns to step 630. Otherwise, if all of the operations of the parallel execution group/section have completed, a determination is made as to whether there were any data dependencies detected, such as identified by the masking value bits (step 680). If no data dependencies are detected, then all of the stores are committed and the iteration of the loop is updated by the number of committed iterations (step 685). If there were data dependencies, then only the iterations (SIMD vector slots) for which no data dependencies were detected are committed (step 690). With this operation, for example, if multiple slots update the same memory location, then the data from a right most SIMD slot (having the highest DPID) is committed to memory. If a data dependency for a SIMD vector slot is detected, the stores for that slot and all stores for slots to the right are not committed.

The masking value bits for the committed iterations and the iterations for which there were dependencies are inverted and the operation is repeated for the same parallel execution group until all of the iterations complete successfully with their results being committed (step 695). The operation then terminates.

As mentioned above, the present invention is not limited to use with a SIMD architecture. As an example of an alternative implementation, the mechanisms of the present invention may be implemented in a multithreaded environment. In such an implementation, a load tracking table data structure, which may be implemented in hardware, software, or any combination of hardware and software, may be used to track load dependencies for a parallel execution group/section. Hardware logic and/or software may be provided in the processor, associated memory, and the like, for performing the various operations of the present invention with regard to such a load tracking table data structure as outlined in the following flowchart of FIGS. 7A and 7B.

Figure 7A:
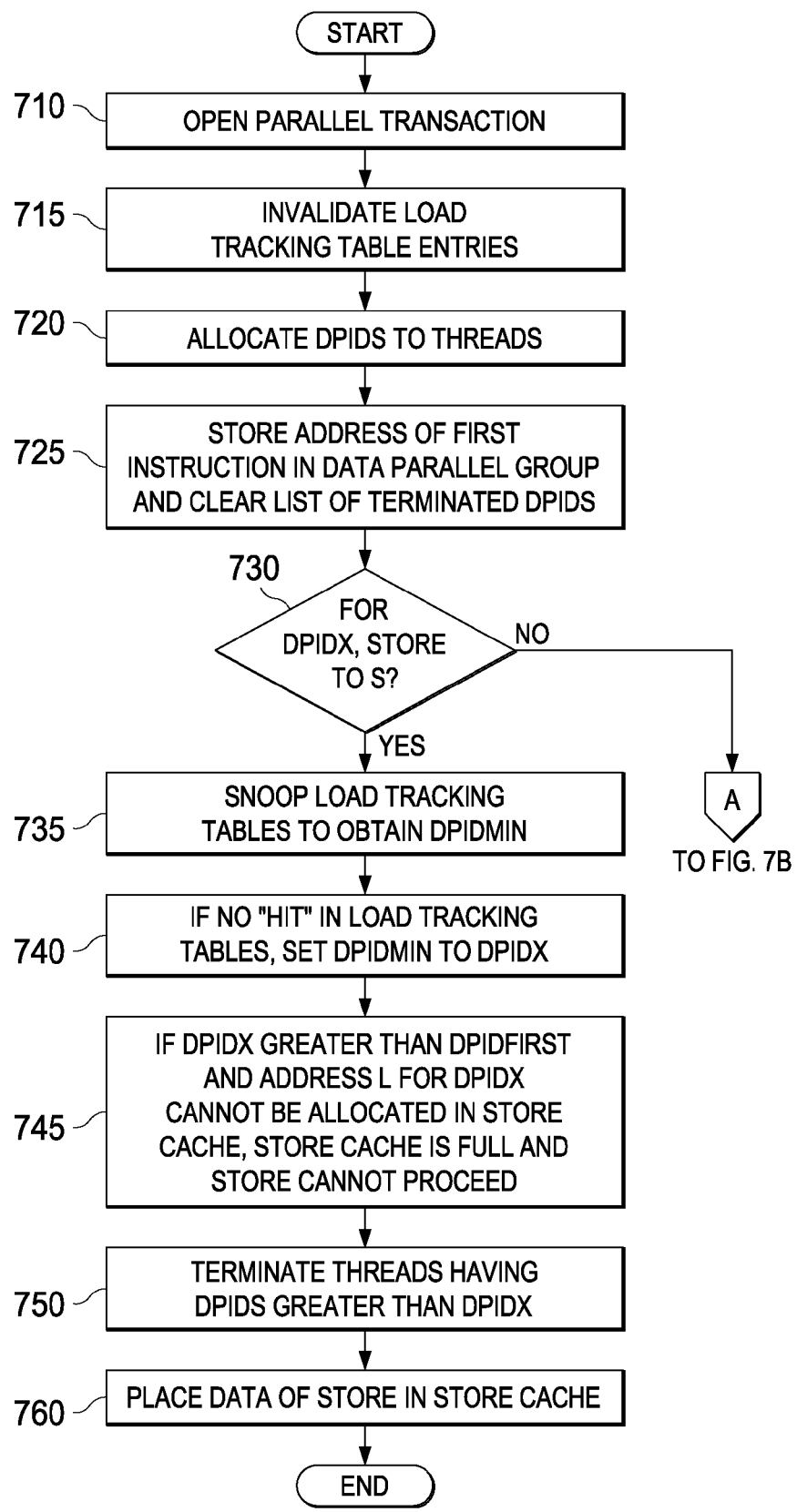
FIGS. 7A and 7B illustrate a flowchart of an example operation for performing runtime data parallel extraction of a loop in accordance with an embodiment in which multithreading is utilized.
Figure 7B:
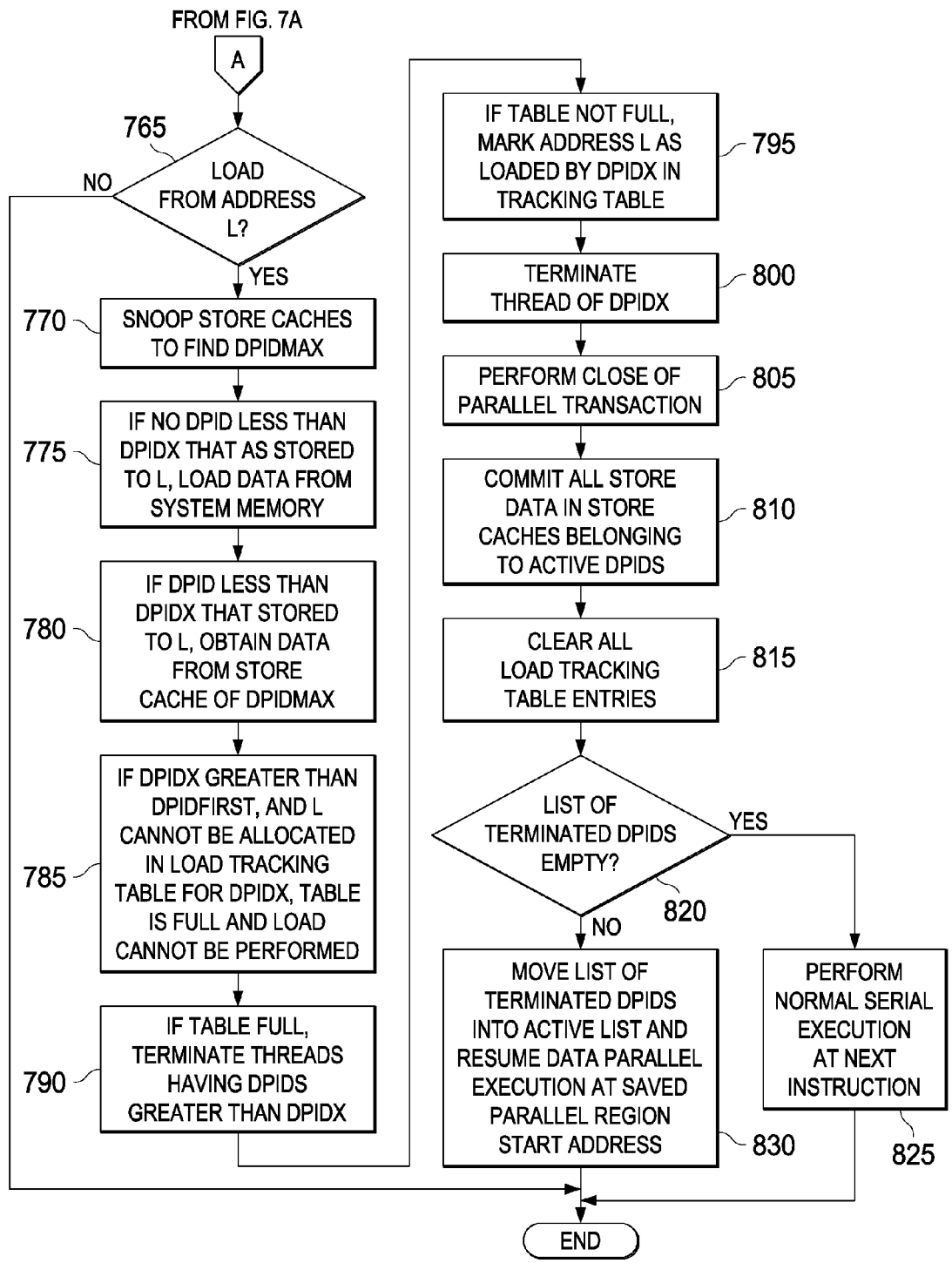

FIGS. 7A and 7B illustrate a flowchart of an example operation for performing runtime data parallel extraction of a loop in accordance with an embodiment in which multithreading is utilized. As shown in FIGS. 7A and 7B, the operation starts with the opening of a parallel transaction by spawning a plurality of threads to handle iterations of the loop for a first parallel execution group/section (step 710). All load tracking table entries are invalidated (step 715) and data parallel identifiers (DPIDs) are allocated to the threads (step 720). The address of the first instruction of the data parallel group/section is stored and a list of terminated DPIDs is cleared (step 725). It should be noted that only the first data parallel thread is guaranteed to complete in the data parallel group/section and thus, this address is stored.

For a next thread in the parallel execution group/section, having a DPID of DPIDx, a determination is made as to whether a store is performed to an address S (step 730). If so, the load tracking tables are snooped to obtain a minimum DPID, that is greater than the DPIDx of the thread performing the store, that has loaded from the location S, referred to hereafter as the DPIDmin (step 735). If there are no DPIDs greater than the DPIDx of the thread performing the store, that have loaded data from the location S, then the current DPIDx of the thread performing the store is the DPIDmin (step 740). If DPIDx is greater than the DPID of the first thread in the parallel execution group/section, and if the address L for DPIDx cannot be allocated into the store cache, the store cache is determined to be full and the store cannot proceed (step 745). All threads having DPIDs greater than or equal to the DPIDx are terminated (step 750). Otherwise, the data of the store performed by DPIDx is placed in the store cache and a tag with the DPIDfirst DPID is stored (step 760).

If the thread is not performing a store operation (step 730), then a determination is made as to whether the thread is performing a load operation from address L (step 765). If so, then the store caches are snooped to find a maximum DPID that is less than or equal to DPIDx that has stored to address L, which is hereafter referred to as DPIDmax (step 770). If there is no DPID that is less than or equal to DPIDx that has stored to address L, the data for the load is obtained from system memory (step 775). Otherwise, the data is obtained from the store cache associated with DPIDmax (step 780).

If DPIDx is greater than DPIDfirst, and the address L can not be allocated into a load tracking table for DPIDx, the load tracking table is determined to be full and the load cannot be performed (step 785). In such a case, all threads having DPIDs greater than or equal to DPIDx are terminated (step 790). Otherwise, address L is marked in the load tracking table as having been loaded by DPIDx (step 795) and the thread associated with DPIDx is terminated (step 800). The termination of the thread associated with DPIDx may involve a cleanup of the status so that maximum progress can be made by threads having DPIDs less than x. Such a cleanup may involve a flash invalidate of all store cache entries for DPIDx, flash invalidate of all load tracking table entries for DPIDx, the addition of DPIDx to the list of terminated DPIDs, and removal of DPIDx from any active list.

Thereafter, a close of the parallel transaction is performed (step 805). This close operation may involve committing all store data in store caches belonging to still active DPIDs (step 810). All load tracking table entries may be cleared (step 815). If the list of terminated DPIDs is empty (step 820), normal serial execution is performed at the next instruction (step 825), otherwise the list of terminated DPIDs is moved into the active list and data parallel execution is resumed at the saved parallel region start address (step 830). The operation then terminates.

Thus, the illustrative embodiments provide mechanisms for runtime extraction of data parallelism. By using the mechanisms of the illustrative embodiments, compilers may simply assume that a loop is able to be optimized for parallel execution by assuming that all iterations are independent. The runtime behavior of the mechanisms of the illustrative embodiments permits the dynamic runtime detection of data dependencies and modification of the execution to accommodate such data dependencies. As a result, loops may be optimized for parallel execution even when it is uncertain whether iterations of the loop may have data dependencies.

It should be appreciated that while the illustrated embodiments are described in terms of the tracking of loads and holding of stores being performed using load and store caches, the illustrative embodiments are not limited to such. Rather, other mechanisms for buffering or keeping track of loads and stores may be used without departing from the spirit and scope of the illustrative embodiments. For example, table data structures, buffers, other memory structures, and the like may be used for achieving these purposes without departing from the spirit and scope of the illustrative embodiments.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An apparatus for extracting data dependencies during runtime, comprising:
   a processor; and
   a memory coupled to the processor, the memory comprising instructions and/or data to be operated upon by the processor, wherein the processor comprises:
   a vector register having a plurality of vector slots;
   a plurality of store caches, each store cache in the plurality of store caches being coupled to and associated with a separate vector slot in the plurality of vector slots; and
   dependency checking logic coupled to the plurality of store caches, wherein the processor:
   executes a first parallel execution group, the first parallel execution group comprising a subset of iterations of a loop, by executing each iteration in the subset of iterations in parallel with other iterations of the subset of iterations, using the vector register, wherein each iteration in the subset of iterations is associated with a separate vector slot in the vector register;
   stores store data for each iteration, in the subset of iterations, that performs a store operation, in a corresponding store cache of the plurality of store caches, associated with the vector slot associated with the iteration;
   determines, by the dependency checking logic, for each iteration in the subset of iterations, whether the iteration has a data dependence; and
   commits store data from the plurality store caches to the memory only for iterations in the subset of iterations for which no data dependence is determined by the dependency checking logic, wherein:
   if a data dependence is detected for an iteration in the subset of iterations, then that iteration and all subsequent iterations in the first parallel execution group are masked so that any store data associated with the iteration and all subsequent iterations are not committed to the memory,
   masking the iteration and all subsequent iterations in the first parallel execution group comprises using a mask vector that comprises a mask value for each of the vector slots, and
   each of the mask values is set to a first value if the iteration corresponding to the vector slot does not have a data dependence and a second value if the iteration corresponding to the vector slot has a data dependence or has a greater data parallel identifier (DPID) than a vector slot whose corresponding iteration has a data dependence.

2. The apparatus of claim 1, wherein the store caches store data for store operations performed by the subset of iterations temporarily without changing a state of the memory prior to being committed to the memory.

3. The apparatus of claim 1, wherein the processor further re-executes iterations, in the subset of iterations, for which data dependences are determined to exist and whose store data is not committed to the memory.

4. The apparatus of claim 1, wherein the processor further increments a loop index of the loop by a number of iterations corresponding to a number of iterations that completed successfully, and generates a second parallel execution group based on the incremented loop index.

5. The apparatus of claim 1, wherein each store cache, in the plurality of store caches:
   can hold different data for each iteration in the subset of iterations for a given target address,
   can evict data in the store caches that is not stored by an iteration in the subset of iterations at any time,
   stores, for store data of a corresponding iteration in the subset of iterations, a tag having an address of the store data, a data parallel identifier (DPID), for each portion of data, an indicator of whether the data is valid or invalid, and an indicator as to whether the DPID is valid or invalid, and
   provides data for all load operations from iterations having corresponding DPIDs greater than the DPID of the data in the store cache.

6. The apparatus of claim 1, wherein the processor stores, in response to an iteration in the subset of iterations performing a load operation, an address associated with the load operation and a data parallel identifier (DPID) associated with the iteration in a load table data structure.

7. The apparatus of claim 1, wherein each vector slot in the vector register has a separate load table data structure.

8. The apparatus of claim 7, wherein the load table data structure comprises an entry for each load operation performed by iterations in the first parallel execution group, and wherein each entry in the load table data structure comprises a data parallel identifier (DPID) associated with an iteration performing the load operation.

9. The apparatus of claim 1, wherein each vector slot in the vector register is associated with a separate data parallel identifier (DPID).

10. The apparatus of claim 9, wherein the processor determines whether an iteration of the subset of iterations has a data dependence by determining if an address of a store operation of the iteration is loaded by an iteration of the loop having a DPID greater than a DPID of the iteration performing the store operation.

11. The apparatus of claim 9, wherein, in response to an instruction associated with a vector slot performing a store operation that specifies an address to which to perform the store operation, the processor determines whether an iteration has a data dependence by:
   snooping, by the dependency checking logic of the processor, load table data structures of the processor that correspond to the vector slots of the vector register;
   determining if a previous load of data from a same address as specified in the store operation was performed by an instruction associated with a DPID greater than a DPID associated with the instruction performing the store operation; and
   recording a data dependency in response to a determination that a previous load of data from the same address as specified in the store operation was performed by an instruction associated with a DPID greater than a DPID associated with the instruction performing the store operation.

12. The apparatus of claim 9, wherein, in response to an iteration in the subset of iterations performing a load operation of data from a specified address, the processor further:
snoops, by the dependency checking logic of the processor, the store caches;
determines, by the dependency checking logic, if there is a DPID that performed a store to the same specified address of the load operation that has a smaller DPID value than, or equal DPID value to, the DPID associated with vector slot of the load operation; and
returns data for the load operation that corresponds to a DPID having a largest DPID value that was snooped, that performed a store to the same specified address, and whose DPID value is equal to or less than the DPID value associated with the vector slot corresponding to the load operation.

13. The apparatus of claim 9, wherein each iteration in the subset of iterations has an associated data parallel identifier (DPID), the DPID associated with an iteration is set to a value corresponding to a vector slot identifier associated with the iteration, and wherein each vector slot identifier is either less than or greater than at least one other vector slot identifier of another vector slot in the vector register.

14. The apparatus of claim 9, wherein each iteration in the subset of iterations has an associated data parallel identifier (DPID), and wherein the DPID associated with an iteration is set to a value corresponding to a thread identifier of a thread executing the iteration.

15. An apparatus for extracting data dependencies during runtime, comprising:
a processor; and
a memory coupled to the processor, the memory comprising instructions and/or data to be operated upon by the processor, wherein the processor comprises:
a vector register having a plurality of vector slots;
a plurality of store caches, each store cache in the plurality of store caches being coupled to and associated with a separate vector slot in the plurality of vector slots; and
dependency checking logic coupled to the plurality of store caches, wherein the processor:
executes a first parallel execution group, the first parallel execution group comprising a subset of iterations of a loop, by executing each iteration in the subset of iterations in parallel with other iterations of the subset of iterations, using the vector register, wherein each iteration in the subset of iterations is associated with a separate vector slot in the vector register;
stores store data for each iteration, in the subset of iterations, that performs a store operation, in a corresponding store cache of the plurality of store caches, associated with the vector slot associated with the iteration;
determines, by the dependency checking logic, for each iteration in the subset of iterations, whether the iteration has a data dependence; and
commits store data from the plurality store caches to the memory only for iterations in the subset of iterations for which no data dependence is determined by the dependency checking logic, wherein if a data dependence is detected for an iteration in the subset of iterations, then that iteration and all subsequent iterations in the first parallel execution group are masked so that any store data associated with the iteration and all subsequent iterations are not committed to the memory, and wherein the processor further operates to:
re-execute iterations, in the subset of iterations, for which data dependences are determined to exist, wherein re-executing iterations comprises inverting a mask vector used to perform the masking of the iteration and any subsequent iterations and reissuing the first parallel execution group.

16. The apparatus of claim 15, wherein the processor further associates each iteration in the subset of iterations with a separate vector slot in the plurality of vector slots of the vector register of the processor, and wherein the first parallel execution group is executed by executing each iteration in the subset of iterations in parallel using the associated separate vector slot for the iteration in the vector register.

17. The apparatus of claim 15, wherein the store caches store data for store operations performed by the subset of iterations temporarily without changing a state of a memory of the data processing system prior to being committed to the memory.

18. The apparatus of claim 15, wherein the processor further increments a loop index of the loop by a number of iterations corresponding to a number of iterations that completed successfully, and generates a second parallel execution group based on the incremented loop index.

19. The apparatus of claim 16, wherein each vector slot in the vector register is associated with a separate data parallel identifier (DPID), and wherein, in response to an instruction associated with a vector slot performing a store operation that specifies an address to which to perform the store operation, the processor determines whether an iteration has a data dependence by:
snooping, by the dependency checking logic of the processor, load table data structures of the processor that correspond to the vector slots of the vector register;
determining if a previous load of data from a same address as specified in the store operation was performed by an instruction associated with a DPID greater than a DPID associated with the instruction performing the store operation; and
recording a data dependency in response to a determination that a previous load of data from the same address as specified in the store operation was performed by an instruction associated with a DPID greater than a DPID associated with the instruction performing the store operation.

20. The apparatus of claim 16, wherein each vector slot in the vector register is associated with a separate data parallel identifier (DPID), and wherein, in response to an iteration in the subset of iterations performing a load operation of data from a specified address, the processor further:
snoops, by the dependency checking logic of the processor, the store caches;
determines, by the dependency checking logic, if there is a DPID that performed a store to the same specified address of the load operation that has a smaller DPID value than, or equal DPID value to, the DPID associated with vector slot of the load operation; and
returns data for the load operation that corresponds to a DPID having a largest DPID value that was snooped, that performed a store to the same specified address, and whose DPID value is equal to or less than the DPID value associated with the vector slot corresponding to the load operation.

* * * * *